United States Patent
Ahmed

(10) Patent No.: US 10,034,577 B2
(45) Date of Patent: Jul. 31, 2018

(54) OUTDOOR COOKING GRILL ASSEMBLY

(71) Applicant: W.C. Bradley Co., Columbus, GA (US)

(72) Inventor: Mallik Ahmed, Columbus, GA (US)

(73) Assignee: W.C. BRADLEY CO., Columbus, GA (US)

( * ) Notice: Subject to any disclaimer, the term of this patent is extended or adjusted under 35 U.S.C. 154(b) by 426 days.

(21) Appl. No.: 14/869,210

(22) Filed: Sep. 29, 2015

(65) Prior Publication Data

US 2016/0015211 A1 Jan. 21, 2016

Related U.S. Application Data

(62) Division of application No. 13/326,791, filed on Dec. 15, 2011, now abandoned.

(60) Provisional application No. 61/424,308, filed on Dec. 17, 2010.

(51) Int. Cl.
  *A47J 37/07* (2006.01)
  *A47J 37/04* (2006.01)
  *A47J 37/06* (2006.01)

(52) U.S. Cl.
  CPC ......... *A47J 37/067* (2013.01); *A47J 37/0682* (2013.01); *A47J 37/0694* (2013.01); *A47J 37/0704* (2013.01)

(58) Field of Classification Search
  CPC ...... A47J 37/07–37/0786; A47J 37/04–37/049
  USPC .................................. 99/422–425, 446–450
  See application file for complete search history.

(56) References Cited

U.S. PATENT DOCUMENTS

| | | | |
|---|---|---|---|
| 4,403,541 A | 9/1983 | Berger | |
| 5,347,978 A | 9/1994 | Zuran | |
| 5,647,339 A * | 7/1997 | Ezra | A47J 37/0682 |
| | | | 126/299 R |
| 6,105,798 A * | 8/2000 | Gruber | B65G 1/023 |
| | | | 211/151 |
| 7,810,487 B2 | 10/2010 | Johnston | |
| 2010/0212515 A1 | 8/2010 | Coutts | |

OTHER PUBLICATIONS

Canadian Intellectual Property Office; Examination Report for Application No. 2,814,761; dated Oct. 14, 2015; Canada.

* cited by examiner

*Primary Examiner* — Michael Laflame, Jr.
(74) *Attorney, Agent, or Firm* — Dennis D. Brown; Brown Patent Law, P.L.L.C.

(57) ABSTRACT

An outdoor grill assembly with a cooking grate therein. The cooking grate can be a one-piece structure but is preferably a two-piece structure wherein the upper piece comprises longitudinally extending food support ribs having hollow interiors. The ribs will be positioned over and cover open areas in the lower structure so that combustion gases flowing through the open areas of the lower structure will flow into the hollow interiors of the food support ribs.

18 Claims, 12 Drawing Sheets

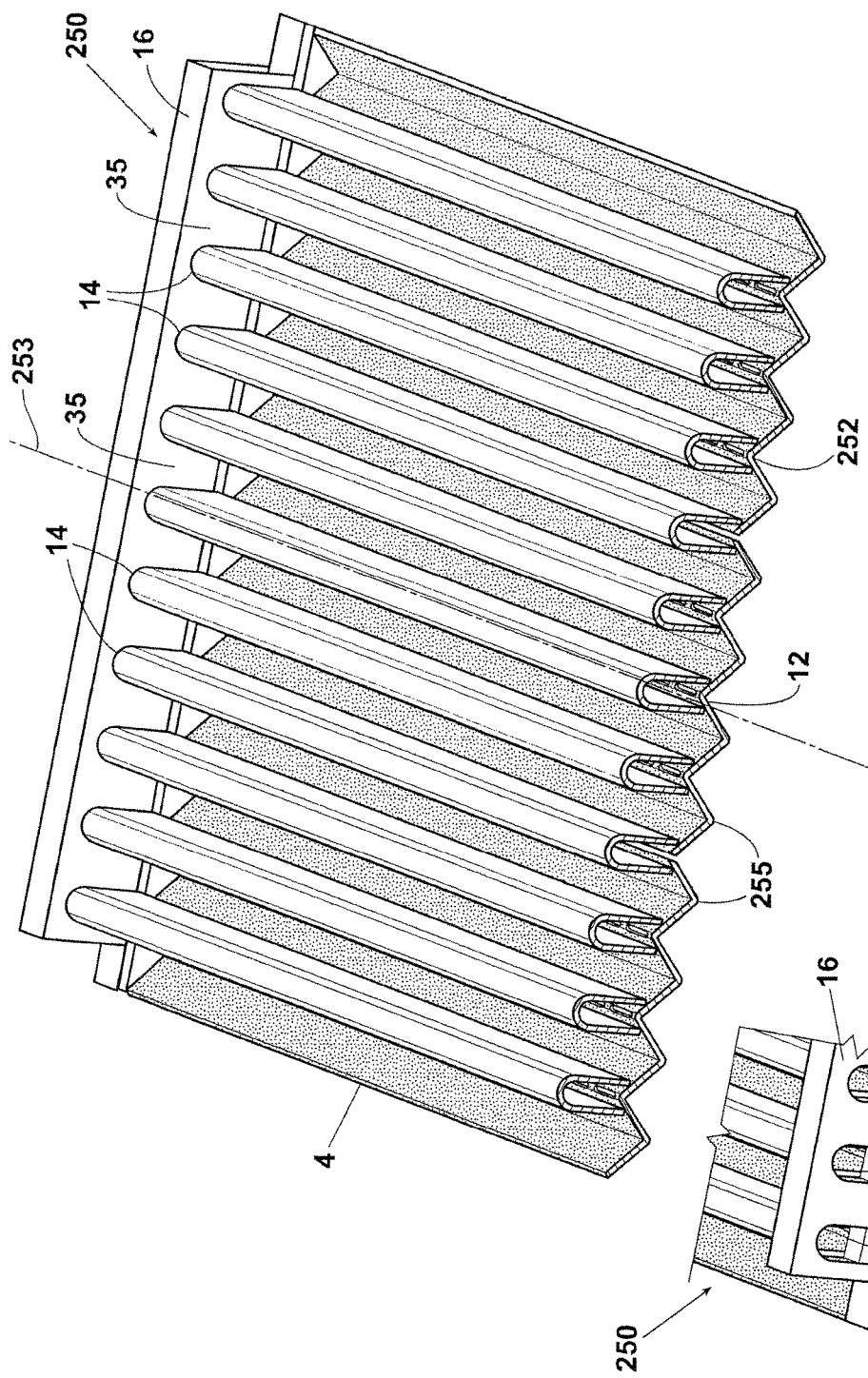

OUTDOOR COOKING GRILL ASSEMBLY

CROSS-REFERENCE TO RELATED CASES

This application is a divisional of co-pending U.S. patent application Ser. No. 13/326,791, filed Dec. 15, 2011. This application also claims the benefit of U.S. Provisional Patent Application Ser. No. 61/424,308 filed Dec. 17, 2010, the disclosure of which is incorporated by reference as if fully set out at this point.

FIELD OF THE INVENTION

The present invention relates to cooking grates and grate assemblies which support food items for cooking in outdoor grills and in other cooking systems. The invention also relates to cooking systems which utilize such grates or grate assemblies

BACKGROUND OF THE INVENTION

Outdoor grilling systems which primarily utilize infrared radiant energy for cooking food items are known in the art. The beneficial results which these systems are capable of providing over conventional convective grills are also well known. However, there are various shortcomings which are often associated with the current infrared systems. The following are examples of such shortcomings and deficiencies commonly encountered in existing infrared grilling systems:
 existing infrared grilling systems typically require the use of expensive infrared burners or other high cost burner systems in order to provide the degree of performance and results desired;
 many existing systems also require the use of a separate infrared emitter plate or other emitting structure positioned intermediate the burner and the food support grate;
 many existing infrared systems, including, but not limited to, those having open grates positioned above an intermediate infrared emitting plate or other structure, are commonly prone to flare-up problems caused by the ignition of fat which drips from the food product; and
 cooking grate structures heretofore developed in the art to reduce flare-ups have also had significant shortcomings or deficiencies in that, for example: (a) they can require extended preheat times; (b) the food contacting portions of the grate do not heat quickly enough and/or do not reach a sufficient temperature for adequately searing the food product and/or for providing attractive grill marks on the product; and/or (c) the grate structures can be difficult and expensive to make due to the need to hold tight tolerances and the difficulty of applying porcelain coatings to small openings.

Consequently, a need currently exists for improved cooking grate structures or assemblies for infrared grills which will: (a) allow lower cost burners or other heating elements to be used for providing excellent infrared cooking results, (b) eliminate the need for a separate emitter plate or other emitting structure intermediate the burner and the grate structure or grate assembly, (c) greatly reduce or eliminate flare-ups, (d) greatly reduce the preheating time required to reach cooking temperature, and (e) rapidly provide high contacting temperatures for searing the food product and producing attractive grill marks. In addition, a continuing need exists for improved infrared cooking systems which will (1) provide increased thermal efficiency and/or (2) provide and transmit a greater percentage of infrared cooking energy to the food product.

SUMMARY OF THE INVENTION

The present invention provides an improved cooking grate or grate assembly and an improved cooking system which satisfy the needs and alleviate the problems discussed above. In one embodiment, the cooking grate assembly preferably comprises: (a) a lower radiating structure and (b) a food support rib structure which is positionable on top of the lower radiating structure.

The food support rib structure preferably comprises a series of parallel food support ribs which have hollow interiors and are each open at the lower end thereof. The lateral cross-section of each rib element will preferably have an inverted U-shape but can alternatively have an inverted V-shape, a rectangular shape, a combination of such shapes, or any other desired geometry.

The lower radiating structure preferably includes apertures, slots, or other openings which will be positioned beneath or inside the lower ends of the food support ribs so that hot combustion gas or other hot flue gas will flow into the rib elements. The lower radiating structure preferably has no openings therethrough which will be positioned in the gaps between the adjacent rib elements.

In addition, although the lower radiating structure can be flat, the lower radiating structure can alternatively comprise a series of parallel ridge structures which will project upwardly in the gaps between the parallel ribs. The ridges can have an inverted V-shape, a wide inverted U-shape, or any other geometry desired, preferably with downwardly sloping or downwardly curving lateral sides.

Moreover, as another alternative, the lower radiating plate can provide downwardly extending valleys between the parallel ribs. By way of example, such valleys can have shapes similar to the ridges just mentioned, but in inverted form.

Further, one or more types of outlet openings are also preferably provided for the rib elements so that hot gas generated by the burner or other heating element does not simply remain stagnant in the interior of the rib elements but continuously flows through and out of the rib elements. This increases and accelerates the heat transfer to the rib elements which greatly reduces the required preheating time and increases the contacting temperature of the rib elements to provide beneficial searing and to produce attractive grill marks. It also increases thermal efficiency and increases the infrared percentage of total cooking energy.

Examples of gas outlet flow openings for the rib elements include, but are not limited to: (a) gas discharge openings provided in one or both of the longitudinal ends of the rib elements, (b) slots, holes, or other apertures provided through one or both of the sidewalls of the rib element, preferably near the top thereof, and/or (c) gaps between the lower radiating structure and the lower ends of the sidewalls of the rib elements, such gaps preferably being formed by spacing the rib elements above the lower radiating structure.

Thus, by way of example, the present invention provides a cooking grate assembly which can comprise: (a) a lower structure comprising a side-by-side series of parallel, longitudinally extending solid sections having substantially no openings therethrough; (b) a series of parallel, longitudinally extending open sections provided in the lower structure, the open sections being located between the solid sections, each of the open sections having an open area lateral width; and (c) an upper structure comprising a side-by-side series of parallel, spaced apart, longitudinally extending food support ribs, each having a hollow interior and a longitudinally extending bottom opening, the bottom opening having a lateral width that is not less than the open area lateral width of the open sections of lower structure.

The upper structure is preferably removably positionable over the lower structure such that the food support ribs will be positioned over and substantially parallel to the open sections of the lower structure. Consequently, as viewed from above the cooking grate assembly, the food support ribs will substantially entirely cover the open sections of the lower structure. When the upper structure is positioned over the lower structure, the open sections of the lower structure will be located within, at, or below the bottom openings of the food support ribs in a manner such that combustion gases flowing upwardly through the open sections of the lower structure will flow into the hollow interiors of the food support ribs.

In another aspect concerning this example, the longitudinally extending solid sections of the lower structure can each have a downwardly extending cross-sectional shape such that the solid sections of the lower structure will form longitudinally extending valleys between the food support ribs. The downwardly extending cross-sectional shape of the solid sections will most preferably be a V-shape.

As another alternative, the longitudinally extending solid sections of the lower structure can have an upwardly extending cross-sectional shape. The upwardly extending cross-sectional shape of the solid sections will most preferably be an inverted V cross-sectional shape such that the solid sections will form longitudinally extending ridges between the food support ribs.

As another example, the present invention provides a cooking grate assembly comprising: (a) a lower structure comprising a side-by-side series of parallel, longitudinally extending solid sections having substantially no openings therethrough; (b) a series of parallel, longitudinally extending open sections provided in the lower structure, the open sections being located between the solid sections, each of the open sections of the lower structure having an open area lateral width; and (c) an upper structure comprising a side-by-side series of parallel, spaced-apart, longitudinally extending food support ribs, each having a hollow interior and a longitudinally extending bottom opening having a lateral width which is greater than the open area lateral width of the open sections of the lower structure.

The upper structure is preferably removably positionable over the lower structure such that the food support ribs will be positioned over and substantially parallel to the open sections of the lower structure. Consequently, as viewed from above the cooking grate assembly, the food support ribs will substantially entirely cover the open sections of the lower structure. The solid sections of the lower structure have a downwardly extending lateral cross-sectional shape such that the solid sections of the lower structure will form longitudinally extending valleys between the food support ribs. When the upper structure is positioned over the lower structure, the open sections of the lower structure will be received in the bottom openings of the food support ribs such that combustion gases flowing upwardly through the open sections of the lower structure will flow into the hollow interiors of the food support ribs.

As another example, the present invention provides an infrared cooking grate comprising alternating side-by-side series of substantially parallel solid sections and food support ribs wherein: (a) the food support ribs have hollow interiors; (b) the food support ribs have open bottoms for receiving combustion gases; and (c) the food support ribs have one or more discharge openings for flow of the combustion gases out of the hollow interiors of the food support ribs.

As yet another example, the present invention provides a grill assembly comprising a housing having therein at least one cooking grate or cooking grate assembly of any type mentioned above or otherwise disclosed herein, or any combination of such cooking grates and/or cooking grate assemblies.

Further aspects, features, and advantages of the inventive cooking grate and cooking system will be apparent to those of ordinary skill in the art upon examining the accompanying drawings and upon reading the following detailed description of the preferred embodiments.

BRIEF DESCRIPTION OF THE DRAWINGS

FIG. 7 is a perspective view of an alternative embodiment 250 of the inventive cooking grate assembly.

FIG. 8 is a perspective end view of the inventive cooking grate assembly 250.

DETAILED DESCRIPTION OF THE PREFERRED EMBODIMENTS

Figure 1:
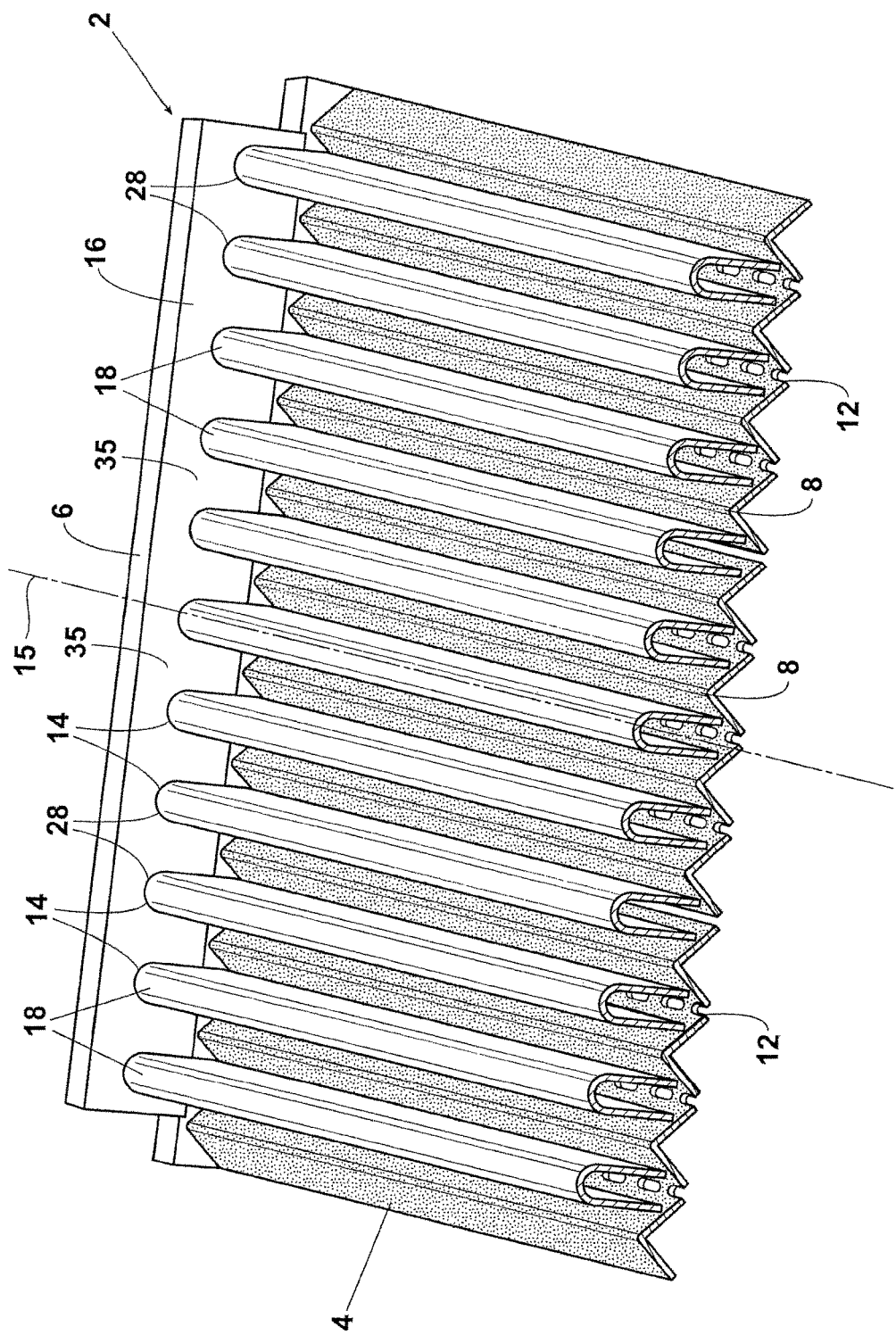
FIG. 1 is a perspective view of an embodiment 2 of the inventive cooking grate assembly.
Figure 2:
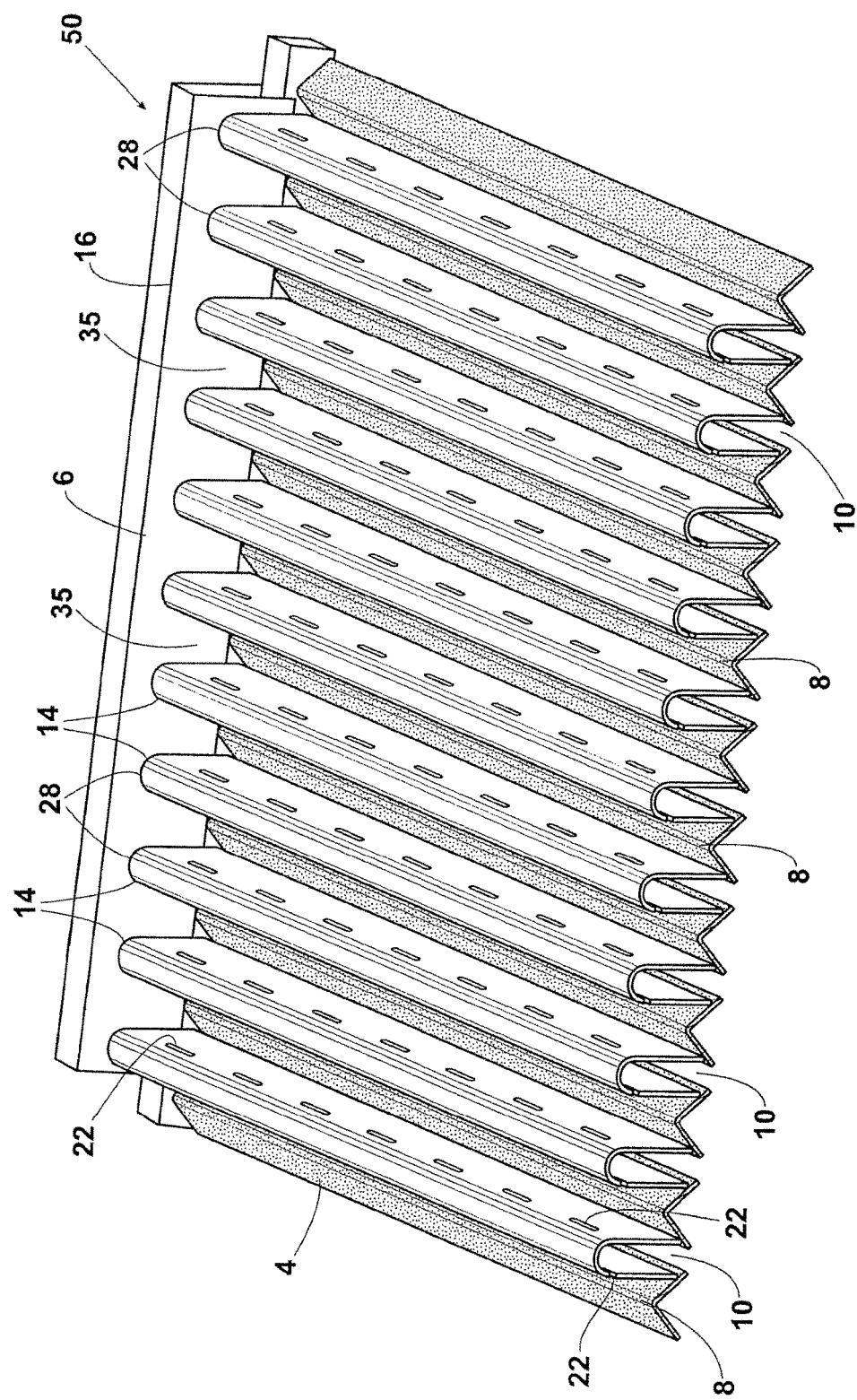
FIG. 2 is a perspective view of an alternative embodiment 50 of the inventive cooking grate assembly.
Figure 3:
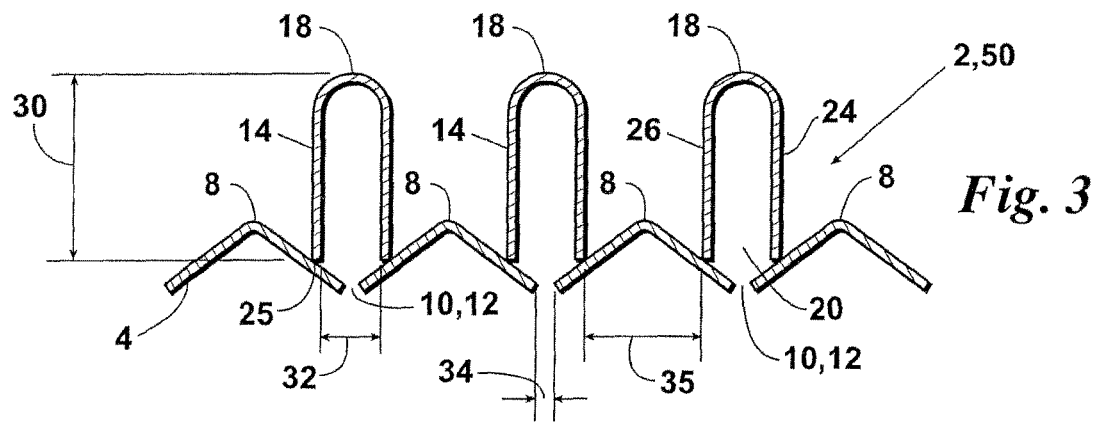
FIG. 3 schematically illustrates an elevational cutaway end view of cooking grate assembly 2 and grate assembly 50.

Embodiments 2 and 50 of the inventive cooking grate apparatus are illustrated in FIGS. 1-3. Each of the inventive cooking grate assemblies 2 and 50 comprises a lower radiating plate 4 and a food support structure 6 which is positioned on top of the radiating plate 4. Although the inventive grate 2 or 50 could be a unitary structure as discussed below, it is preferred, for reasons of ease of manufacture, lower cost, and cleaning, that the lower radiating plate 4 and the food support structure 6 be manufactured and used together as separate pieces such that the food support structure 6 is removably placeable on top of the lower radiating plate 4.

The lower radiating plate 4 comprises a series of parallel ridge structures 8 which preferably have an inverted V-shape. As seen in FIG. 1, the ridge structures 8 extend longitudinally and therefore are substantially parallel to the longitudinal center line 15 of the grate assembly 2 or 50. Elongate slots 10 or a series of shorter slots 12, or other gas flow apertures, are provided along the bottoms of the valleys formed between each adjacent pair of ridges 8.

Given the ability of the inventive cooking grate assemblies 2 and 50 to heat the food support ribs 14 of the food support structure 16 to higher temperatures, and in view of the exponential increase in infrared emission levels which these higher temperatures will provide, the lower radiating plate 4 can be formed of generally any material which will withstand these operating temperatures and which preferably (a) is at least minimally corrosion resistant and (b) has an emissivity of at least 0.25 (more preferably at least 0.3, more preferably at least 0.4, more preferably at least 0.5, more preferably at least 0.6, more preferably at least 0.7 and more preferably at least 0.8). Examples of suitable materials include, but are not limited to: coated steel (e.g., porcelain-coated steel), treated cast iron, or titanium. The emissivity of stainless steel having an ordinary finish will also increase to a more desirable level during operation as a result of oxidation and the deposition of food debris which operate to darken the surface.

More preferred materials having desirably high emissivities include, but are not limited to: porcelain-coated steel (most preferably steel with a black porcelain coating providing an emissivity of more than 0.9); shot blasted stainless steel; and oxidized stainless steel. It will also be understood that numerous other materials having excellent emissivities which are more expensive to purchase and/or use in manufacturing can also be employed, but are not necessary.

The food support structure 6 preferably comprises a side-by-side series of parallel food support ribs 14 which are connected to and extend from a lateral cross support 16, or extend between a pair of opposing lateral cross supports 16. As seen in FIG. 1, the food support ribs 14 extend longitudinally and are therefore substantially parallel to the longitudinal center line 15 of the grate assembly 2 or 50. The food support ribs 14 preferably have an inverted U-shape with a rounded top 18 but can alternatively be of a rectangular or square shape, an inverted V-shape, a combination of such shapes, or any other desired geometry. The food support ribs 14 have lower ends 25 which rest on top of the lower radiating plate 4 in the ridge valleys such that the openings 20 in the lower ends of the ribs 14 straddle the slots 10, 12 or other gas openings provided in the ridge valleys of the lower plate 4.

The food support ribs 14 preferably also include either (a) flue exhaust slots or other openings 22 (as illustrated in grate assembly 50) which extend along one side 24 or both sides 24 and 26 (preferably both of sides 24 and 26) of the ribs 14 near the tops thereof; (b) flue exhaust openings, as used in grate assembly 2, provided through one or both of the longitudinal ends 28 of each rib with corresponding exhaust 40 openings provided through the lateral cross-support(s) 16 (not shown in FIGS. 1-3 but see the example of such openings 40 shown in FIG. 8); or (c) a combination thereof. Because of the exhaust openings provided near the tops and/or through the longitudinal end(s) of the food support ribs 14, the hot gas received through the lower plate openings 10 or 12 does not remain stagnant but instead continuously flows through and accelerates the heating of the support ribs 14.

In the inventive grate assembly 50, as well as all of the other embodiments of the inventive grate assembly discussed herein when manufactured to have upper flue gas slots 22 (or a single elongate slot 22) extending along each side 24 and 26 of the food support ribs 14, the number and/or size of the slots will preferably be effective such that, at an operating temperature of 600° F., the flow of flue gas into the ribs 14 and out of the slots 22 will (a) reduce the warm-up time of the grate assembly by at least 10% (more preferably at least 15% and most preferably at least 20%) and/or (b) increase the thermal efficiency of the grate assembly by at least 8% (more preferably at least 10% and most preferably at least 13%) versus a high performance prior art infrared grate assembly of the type shown in FIG. 1 of U.S. Patent Application Publication No. US2007/0125357 A1 (discussed below). The single elongate slot 22 or plurality of slots 22 in each side wall 24 and 26 of the food support rib 14 will preferably have a width in the range of from about 0.03 to about 0.1 inch. The width of the slot(s) 22 will more preferably be in the range of from about 0.035 to about 0.085 inch and will most preferably be in the range of from about 0.05 to about 0.06 inch.

In the inventive grate assembly 2, as well as all of the other embodiments of the inventive grate assembly discussed herein when manufactured to have flue gas flow out of one or both longitudinal ends of each food support rib 14, the size (and thus the resulting surface area) of the ribs 14, along with the flue gas flow through the ribs, will preferably be effective such that, at an operating temperature of 600° F., the flow of flue gas into the ribs 14 and out of the end(s) thereof will (a) increase the infrared energy output percentage of the grate assembly by at least 10% (more preferably at least 15% and most preferably at least 20%) and/or (b) reduce the warm-up time of the grate assembly by at least 10% (more preferably at least 15% and most preferably at least 20%) versus a high performance prior art infrared grate assembly of the type shown in FIG. 1 of U.S. Patent Application Publication No. US 2007/0125357 A1.

By way of example, but not by way of limitation, the food support ribs 14 can be formed of any of the same suitable and preferred materials discussed above for the lower radiating plate 4. In addition, the ribs 14 can also be treated with a corrosion-resistant and/or nonstick coating such as porcelain, PTFE, silicone oxide ceramic, tantalum, or other known coating technologies.

The food support ribs 14 of the inventive grate assemblies 2 and 50 will preferably have a height 30 in the range of from about 0.2 to about 1.25 inches and will more preferably have a height in the range of from about ¼ to about 1 inch. The lateral width 32 of the bottom openings 20 of the food support ribs 14 must be sufficient such that the hot flue gas can flow into and out of the ribs 14 without creating sufficient back pressure to cause a combustion failure in the grilling system. The lateral width 32 of the lower end openings 20 of the support ribs 14 will preferably be at least ⅛ inch. The lateral width 32 of the bottom openings 20 of the ribs 14 will more preferably be at least ¼ inch and will most preferably be in the range of from about 0.28 to about 0.32 inch.

In order to be sufficiently wide for easy cleaning without being so wide as to permit a large enough inflow of fresh atmospheric air to cause flare-up problems, the lateral width 35 of the gaps between adjacent support ribs 14 will preferably be in the range of from about ¼ to about 1 inch and will more preferably be in the range of from about ½ to about ¾ inch.

In one alternative embodiment, the slots 10 or 12 or other openings provided in the ridge valleys of the lower radiating plate 4 can be of substantially the same width 32 as the bottom openings 20 of the support ribs 14. When large plate openings of this size are employed, the user will have the option of simply removing the food support structure 6, if desired, and using the lower plate 4 essentially in the same manner as a conventional convection cooking grate.

However, for better manufacturing control which will ensure that no gaps will exist outside of the ribs 14 and cause flare-ups, the width 34 of the slots 10 or 12 or other openings provided in the ridge valleys of the lower radiating plate 4 will preferably be narrower than the lateral width 32 of the bottom openings 20 of the support ribs 14. Moreover, I have discovered that, although the use of narrower plate openings 10, 12 allows a lesser amount of direct infrared emission from the burner into the rib bottom openings, the narrower plate openings unexpectedly create a surprising jet flow effect whereby the velocity of the flue gas flowing into the support ribs 14 is increased and creates more turbulent flow conditions within the food support ribs 14. This beneficial turbulence significantly increases the rate and degree to which the hot gas heats the food support ribs and effectively cancels out (i.e., compensates for) any reduction in radiant heat transfer to the rib interior.

To allow sufficient flow to prevent combustion failure, the width 34 of the plate slots or other openings 10, 12, will preferably be at least 0.02 inch, more preferably at least 0.04 inch. The width 34 of the plate slots or other openings 10, 12, will more preferably be in the range of from about 0.8 to about 0.05 (more preferably from about 0.5 to about 0.08 and most preferably from about 0.3 to about 0.1) times the lateral width 32 of the rib bottom openings 20.

The inventive grate assemblies 2 and 50 provide surprisingly significant increases in energy efficiency and/or infrared energy output as compared to even the best cooking grates and cooking grate assemblies heretofore known in the art. Tests were conducted, for example, to compare the inventive grate assemblies 2 and 50 with the high performance prior art infrared grate assembly shown in FIG. 1 of U.S. Patent Application Publication No. US2007/0125357 A1. In the prior art grate assembly, flue gas either does not enter the food support ribs or is stagnant. These tests were conducted using an otherwise conventional grill with a single wall fire box and simple large tube burners which ran from front to back. The results were as follows:

The prior art high performance infrared grate required 7.38 minutes to heat to an operating temperature of 600° F. The thermal efficiency of the prior art grate was 29.1% and 62.2% of the total energy output to the food product was in the form of infrared energy.

The inventive grate assembly 2 required only 5 minutes to heat to an operating temperature of 600° F. (i.e., a 32.2% reduction in the time required by the prior art grate assembly). The thermal efficiency of the inventive grate assembly 2 was substantially the same as the prior art grate but the infrared energy output percentage was 76.4% (i.e., a 22.8% improvement over the prior art grate assembly).

The inventive gate assembly 50 also provided a 32.2% reduction in preheating time. The infrared energy output percentage of the inventive grate 50 was somewhat higher than that of the prior art grate and the thermal efficiency of the inventive grate assembly 50 was 34.1% (i.e., a 17.2% improvement over the prior art grate assembly).

Moreover, in addition to the improvement in thermal efficiency provided by inventive grate assembly as measured by flux testing after reaching the specified cooking temperature (i.e., 600° F.), each of the inventive grate assemblies 2 and 50 also provides a further significant improvement in thermal efficiency by greatly reducing the necessary preheating time and thereby reducing the total time and amount of fuel/energy required to cook a food product. Also, the performance advantages of the inventive cooking grates and assemblies over the prior art high performance grates can be even further enhanced when used with burner systems such as those described in U.S. Patent Application Publication Nos. US2009/0202688 and US2010/0095951 which can provide high heat output while allowing an increase in the back pressure produced by the cooking grate.

The bottom edges 25 of the food support ribs 14 of grate assemblies 2 and 50 rest on the lower radiating plate 4. The contact between the ribs 14 and the plate 4 is not sealed so that hot fat which drips into the gaps between the support ribs 14 will flow beneath the lower ends 25 of the ribs 14 and out of the slots or other openings 10, 12 formed in the ridge valleys of the lower radiating plate 4. Because of the drainage occurring through the slots or other openings 10, 12 formed in the lower radiating plate 4, a grill assembly utilizing the inventive grate 2 or the inventive grate 50 will also preferably utilize a grease drip pan installed beneath the grill burner or other heating element.

Although the parallel ridges 8 of the radiating plates 4 shown in FIGS. 1 and 3 have an inverted V-shape, it will be understood that the ridges 8 could be of any other shape, a few examples of which are illustrated below, and of any angle, slope, and/or curvature which will preferably promote drainage toward the plate openings 10, 12. The inventive grates 2 and 50 require less frequent cleaning than other grate systems and are also easily cleaned because (a) the very hot, low viscosity fat which flows beneath the rib side edges will not readily clog the radiating plate slot openings 10, 12 and (b) any debris which accumulates in the gaps between the ribs 14 can be readily removed by lifting the food support structure 6 and brushing the lower radiating plate 4. Moreover, a further advantage of the inventive grate assemblies 2 and 50 is that the inventive assembly 50 is highly resistant to flare-ups and the inventive assembly 2 substantially eliminates the possibility of flare-ups entirely.

Figure 4:
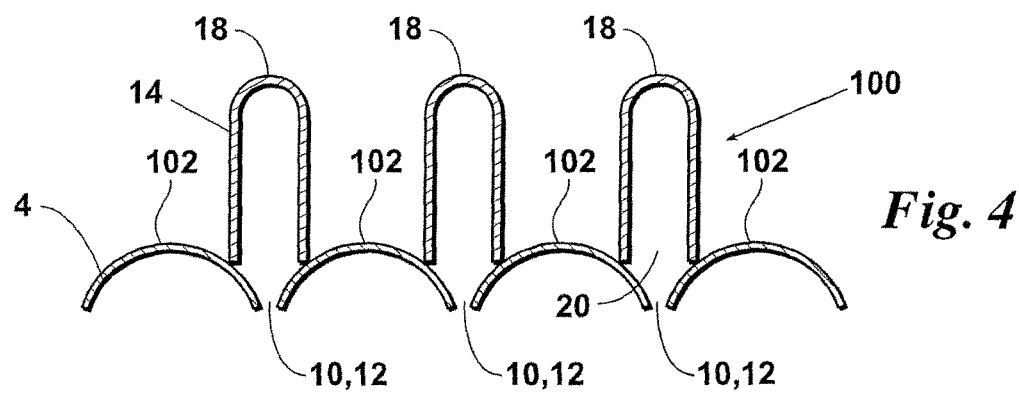
FIG. 4 schematically illustrates an elevational cutaway end view of an alternative embodiment 100 of the inventive cooking grate assembly.

An alternative embodiment 100 of the inventive grate assembly is illustrated in FIG. 4. Except for the differences discussed below, the construction, features, materials, and other particulars of the inventive grate assembly 100 will preferably be the same as inventive assembly 2 and/or inventive assembly 50 and these features will provide all of the same benefits and advantages discussed above.

The inventive grate assembly 100 will preferably be identical to either the inventive grate assembly 2 or the inventive grate assembly 50, or a combination thereof, except that the parallel structures 102 of the lower radiating plate 4 of the assembly 100 have an upwardly curved rather than an inverted V cross-sectional shape.

Figure 5:
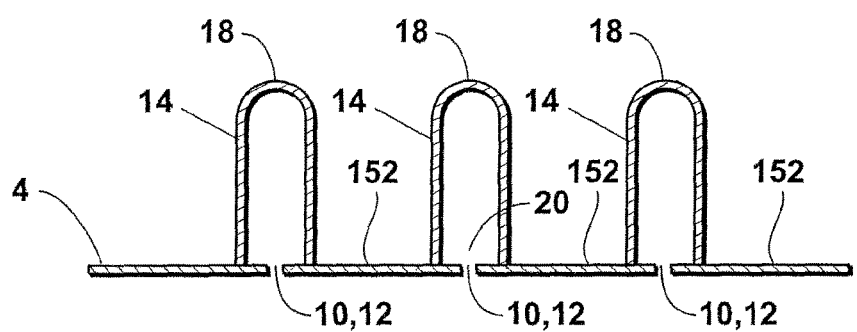
FIG. 5 schematically illustrates an elevational cutaway end view of an alternative embodiment 150 of the inventive cooking grate assembly.

An alternative embodiment 150 of the inventive grate assembly is illustrated in FIG. 5. Except for the differences discussed below, the construction, features, materials, and other particulars of the inventive assembly 150 will preferably be the same as those of the inventive assembly 2 and/or the inventive assembly 50 and these features will therefore provide all of the same benefits and advantages discussed above.

The inventive grate assembly 150 will preferably be identical to inventive grate assembly 2 or inventive grate assembly 50, or a combination thereof, except that the parallel structures 152 of the lower radiating plate 4 of the grate assembly 150 are flat rather than having an inverted V cross-sectional shape. Consequently, although easier to manufacturer, the rate of fat drainage from the inventive grate assembly 150 will be slower than is provided by inventive assemblies 2 and 50.

Figure 6:
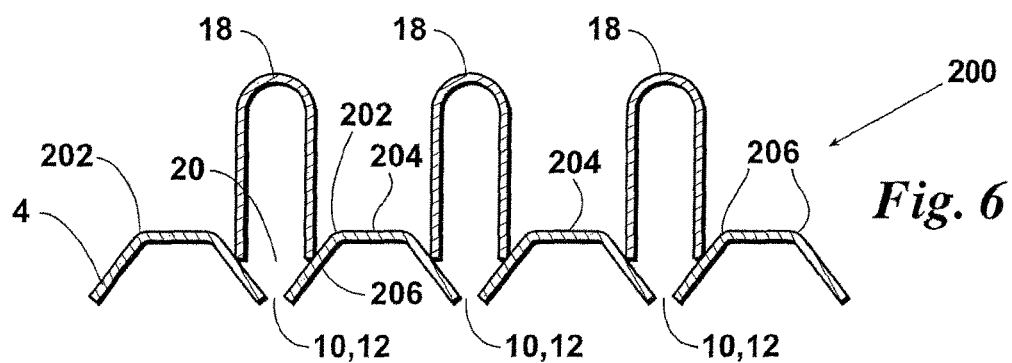
FIG. 6 schematically illustrates a cutaway elevational end view of an alternative embodiment 200 of the inventive cooking grate assembly.

An alternative embodiment 200 of the inventive grate assembly is illustrated in FIG. 6. Except for the differences discussed below, the construction, features, materials, and other particulars of the inventive assembly 200 will preferably be the same as those of the inventive assembly 2 and/or the inventive assembly 50 and these features will therefore provide all of the same benefits and advantages discussed above.

The inventive grate assembly 200 will preferably be identical to inventive grate assembly 2 or inventive grate assembly 50, or a combination thereof, except that the parallel structures 202 of the lower radiating plate 4 of the grate assembly 200 have flat top surfaces 204 with downwardly sloping sides 206 which facilitate fat drainage.

Figure 10:
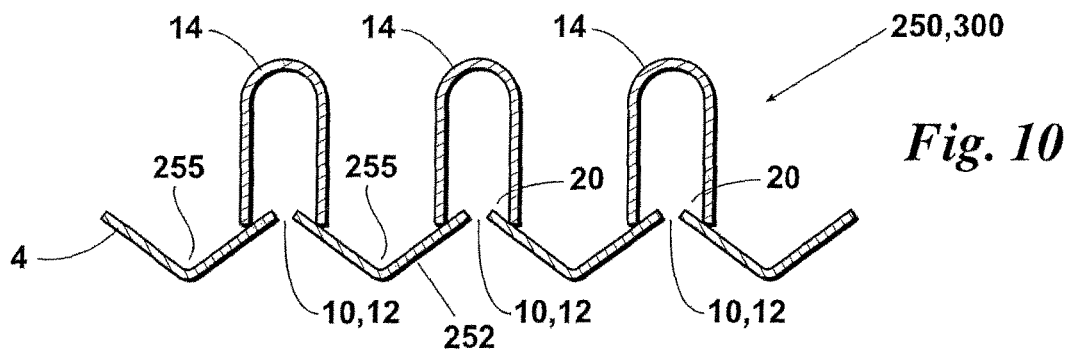
FIG. 10 schematically illustrates a cutaway elevational end view of the inventive cooking grate assembly 250 and the inventive cooking grate assembly 300.

An alternative embodiment 250 of the inventive grate assembly is illustrated in FIGS. 7, 8, and 10. Except for the differences discussed below, the construction, features, materials, and other parameters of the inventive grate assembly 250 will preferably be the same as those of the inventive grate assembly 2 and/or the inventive assembly 50 and these features will therefore provide all of the same benefits and advantages discussed above.

Inventive grate assembly 250 is identical to the inventive grate assembly 2 except that (a) the food support ribs 14 of assembly 250 rest on top of the inverted V-shaped ridges 252 of the lower radiating plate 4 and (b) the flue slots or other apertures 10, 12 of the lower radiating plate 4 of assembly 250 are therefore provided along the ridge peaks rather than in the valleys between the ridges 252. FIG. 8 illustrates the flue gas exhaust openings 40 provided in the lateral rib holding member 16 which can be used in either of embodiments 2 or 250, and in other embodiments discussed herein, to allow gas flow out of the longitudinal ends of the ribs 14.

Because the lower radiating plate 4 of inventive grate assembly 250 forms downwardly extending V-shaped valleys 255 in the gaps between the food support ribs 14, fat and water which drips into the valleys 255 between the support ribs 14 will collect therein rather than draining from the radiating plate flue openings 10 or 12. Consequently, the inventive grate assembly 250 requires more frequent cleaning than the inventive assembly 2 but will not require the installation of a drip pan below the grill burner or heating element. The fat and water which collect in the gaps between the food support ribs 14 vaporizes during the cooking process and is infused back into the food product to make the product even more tender, moist, and flavorful.

Figure 9:
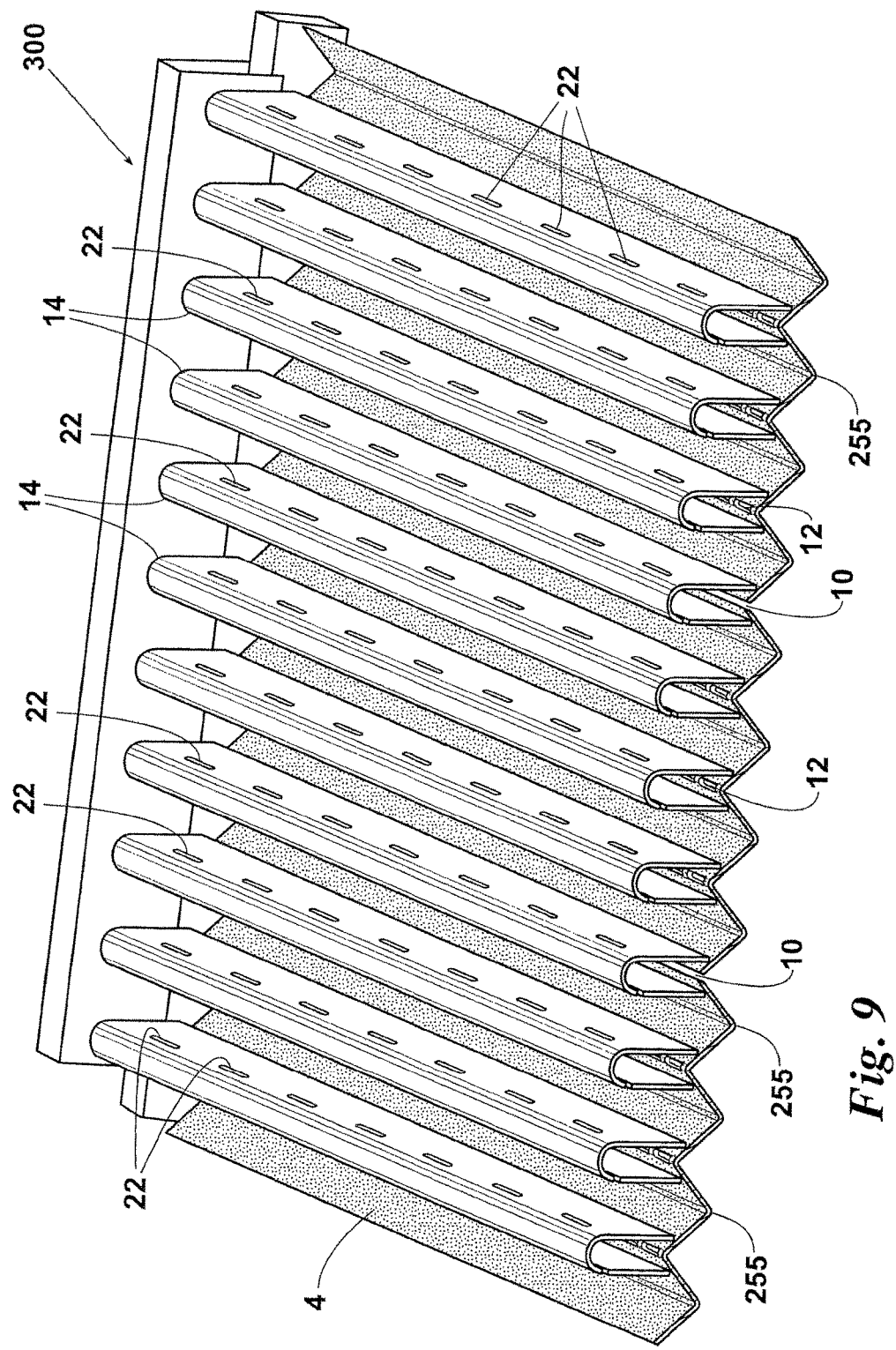
FIG. 9 is a perspective view of an alternative embodiment 300 of the inventive cooking grate assembly.

An alternative embodiment 300 of the inventive grate assembly is illustrated in FIGS. 9 and 10. Except for the differences discussed below, the construction, features, materials, and other particulars of the inventive grate assembly 300 will preferably be the same as those of the inventive assembly 50 and these features will therefore provide all of the same benefits and advantages discussed above.

The inventive grate assembly 300 is identical to the inventive grate assembly 250 except that the food support ribs 14 of the inventive assembly 300 utilize flue exhaust slots or other openings 22 identical to those used in assembly 50 which extend along either or both sides 24 and 26 of the ribs 14 near the upper ends thereof.

It will also be understood that inventive grate assembly 300 could, if desired, be further adapted to also allow flue exhaust flow through the longitudinal ends of the food support ribs 14 as illustrated in FIG. 8.

Figure 11:
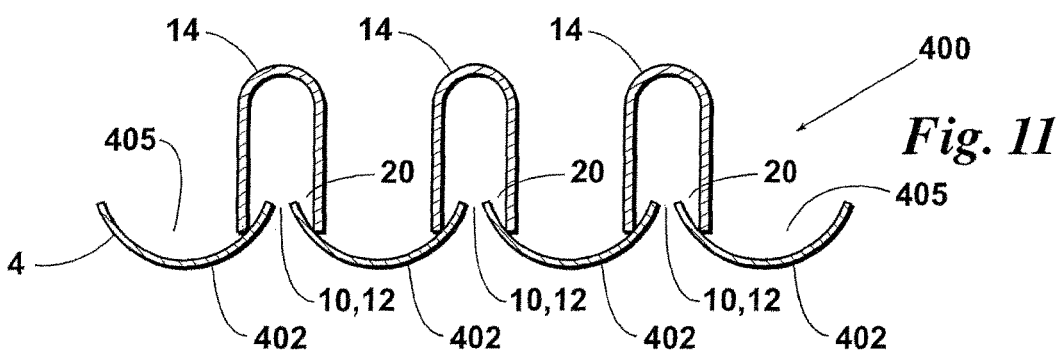
FIG. 11 schematically illustrates a cutaway elevational end view of an alternative embodiment 400 of the inventive cooking grate assembly.

An alternative embodiment 400 of the inventive grate assembly is illustrated in FIG. 11. Except for the differences discussed below, the construction, features, materials, and other particulars of the inventive grate assembly 400 will preferably be the same as those of the inventive assembly 2 and/or the inventive assembly 50 and these features will therefore provide all of the same benefits and advantages discussed above.

The inventive grate assembly 400 is identical to the inventive assembly 250 or the inventive assembly 300, or a combination thereof, except that the parallel structures 402 of the lower radiating plate 4 form a downwardly dipping U-shape 405, rather than a downwardly dipping V-shape, in the gaps between the food support members 14.

Figure 12:
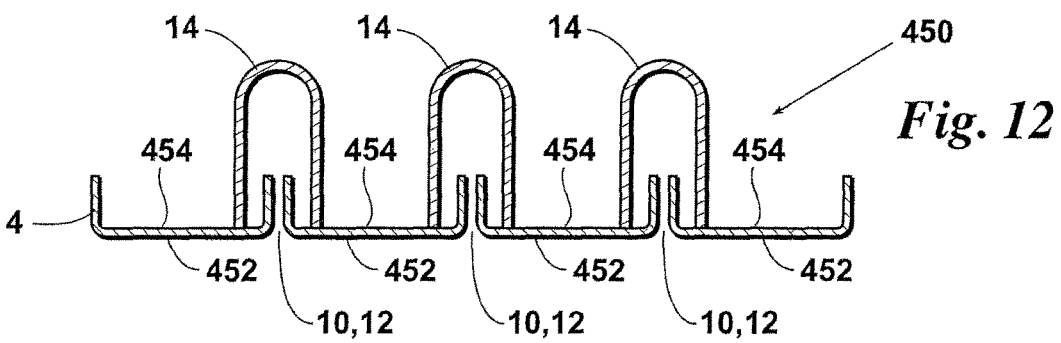
FIG. 12 schematically illustrates a cutaway elevational end view of an alternative embodiment 450 of the inventive cooking grate assembly.

An alternative embodiment 450 of the inventive grate assembly is illustrated in FIG. 12. Except for the differences discussed below, the construction, features, materials, and other particulars of the inventive grate assembly 450 will preferably be the same as those of the inventive assembly 2 and/or inventive assembly 50 and these features will therefore provide all of the same benefits and advantages.

The inventive grate assembly 450 will preferably be identical to inventive assembly 250 or inventive assembly 300, or a combination thereof, except that the parallel structures 452 of the lower radiating plate 4 will have a wide U cross-sectional shape for collecting water and grease with a flat bottom surface 454 which extends between the adjacent food support ribs 14.

Figure 13:
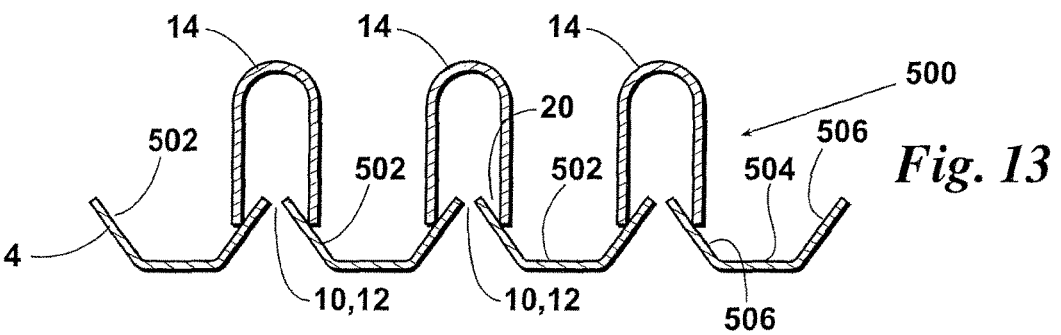
FIG. 13 schematically illustrates a cutaway elevational end view of an alternative embodiment 500 of the inventive cooking grate assembly.
Figure 14:
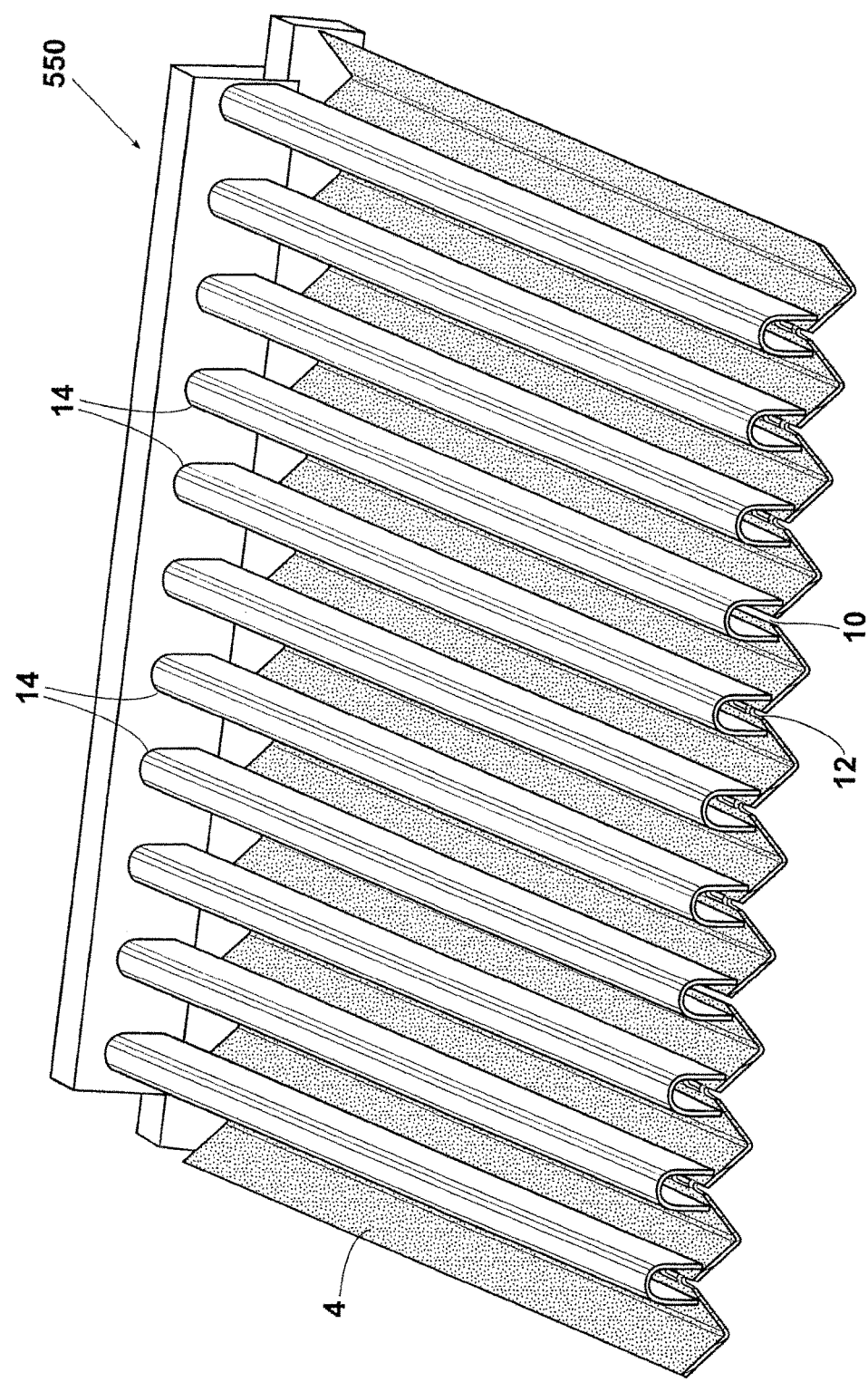
FIG. 14 is a perspective view of an alternative embodiment 550 of the inventive cooking grate assembly.
Figure 15:
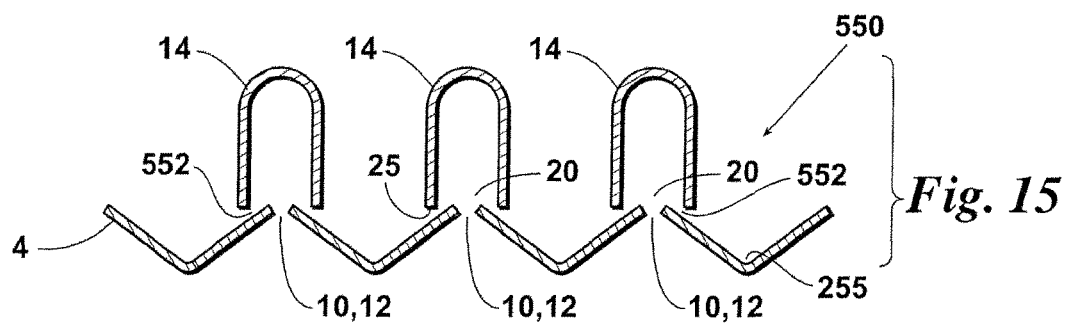
FIG. 15 schematically illustrates a cutaway elevational end view of the inventive cooking grate 550.
Figure 16:
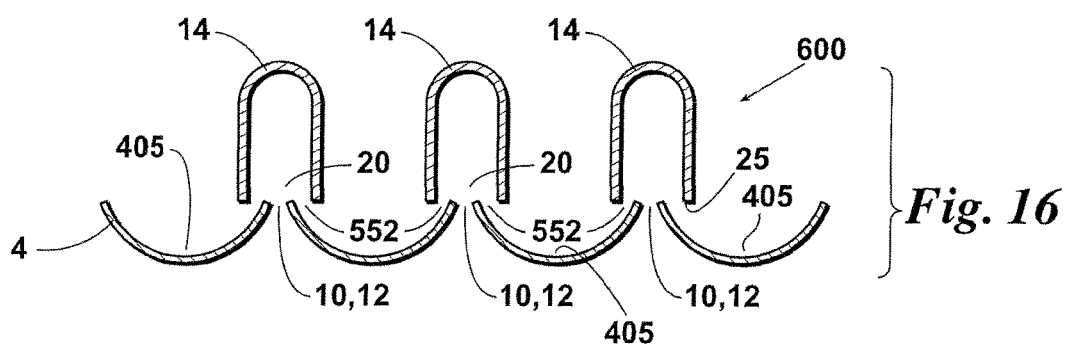
FIG. 16 schematically illustrates a cutaway elevational end view of an alternative embodiment 600 of the inventive cooking grate assembly.
Figure 17:
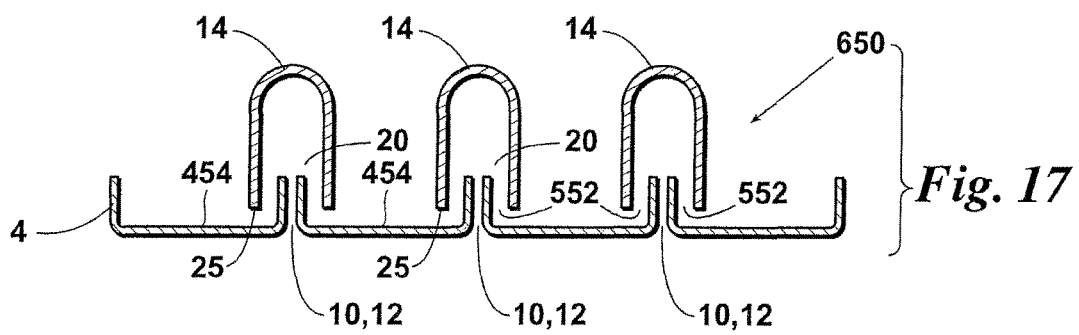
FIG. 17 schematically illustrates a cutaway elevational end view of an alternative embodiment 650 of the inventive cooking grate assembly.
Figure 18:
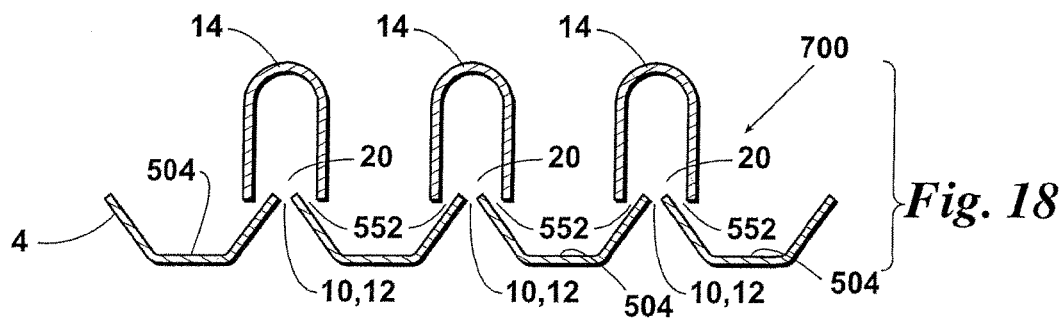
FIG. 18 schematically illustrates a cutaway elevational end view of an alternative embodiment 700 of the inventive cooking grate assembly.
Figure 19:
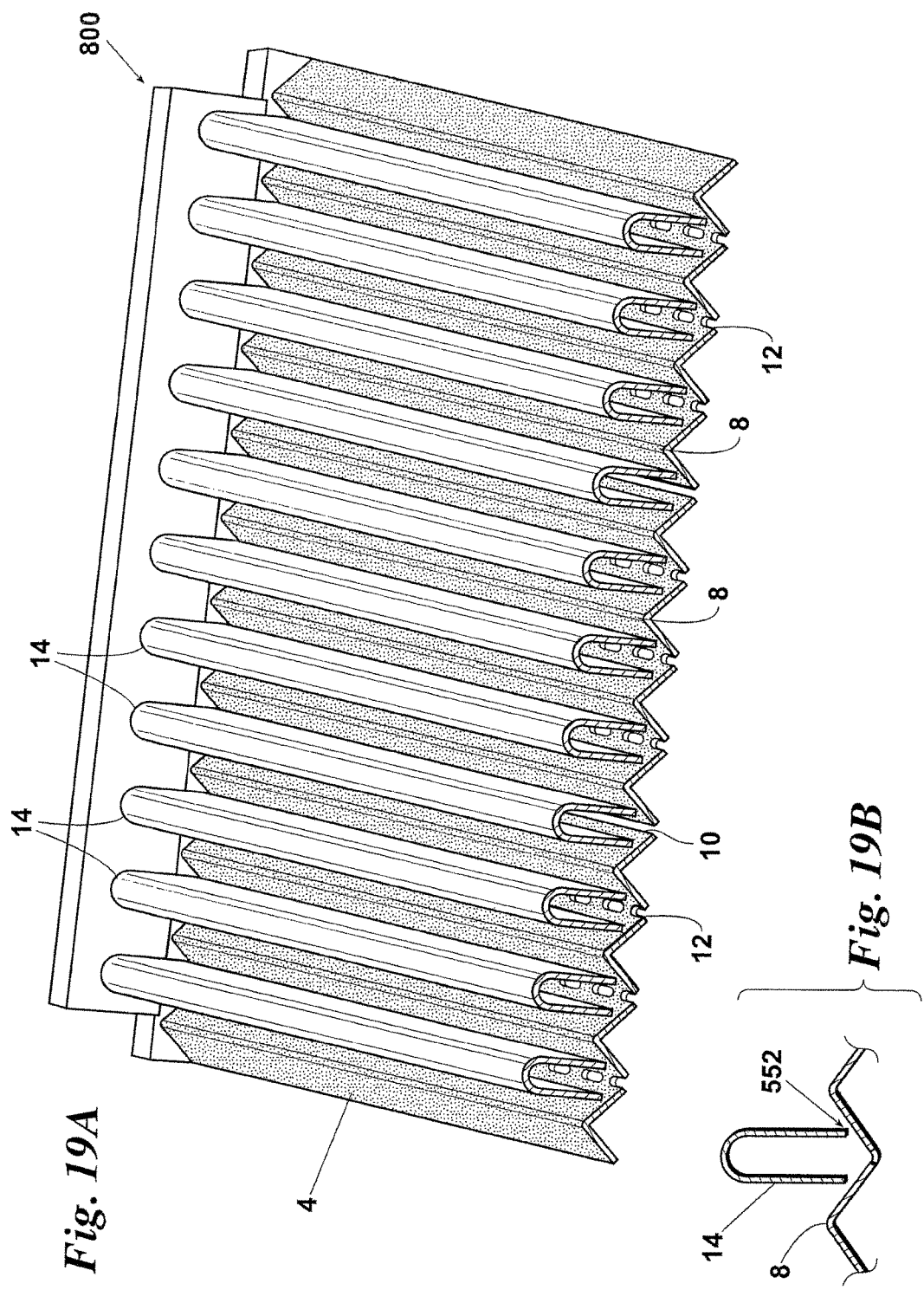
FIGS. 19A and 19B are perspective and end views of an alternative embodiment 800 of the inventive cooking grate assembly.
Figure 20:
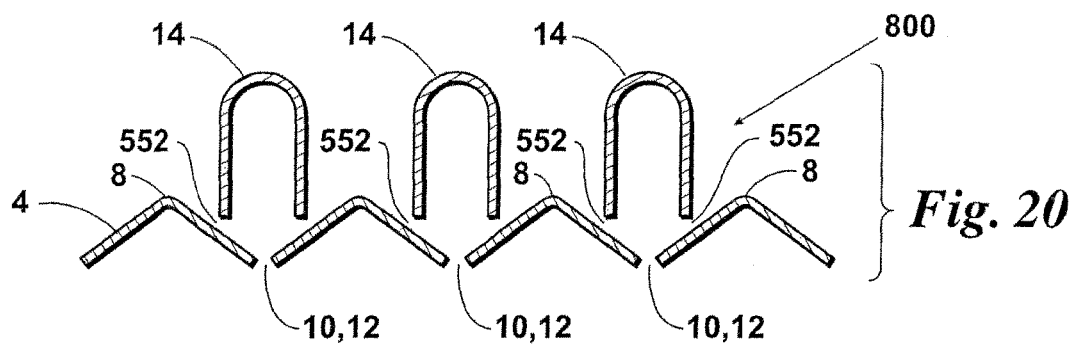
FIG. 20 schematically illustrates a cutaway elevational end view of inventive grate assembly 800.
Figure 21:
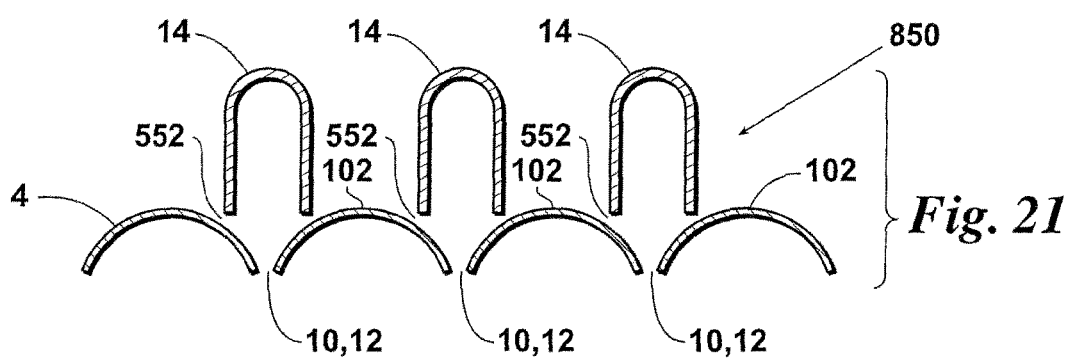
FIG. 21 schematically illustrates a cutaway elevational end view of an alternative embodiment 850 of the inventive cooking grate assembly.
Figure 22:
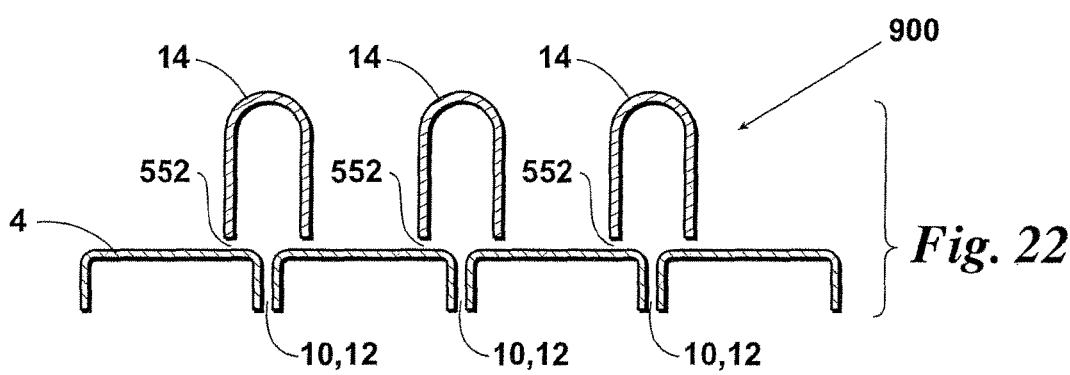
FIG. 22 schematically illustrates a cutaway elevational end view of an alternative embodiment 900 of the inventive cooking grate assembly.
Figure 23:
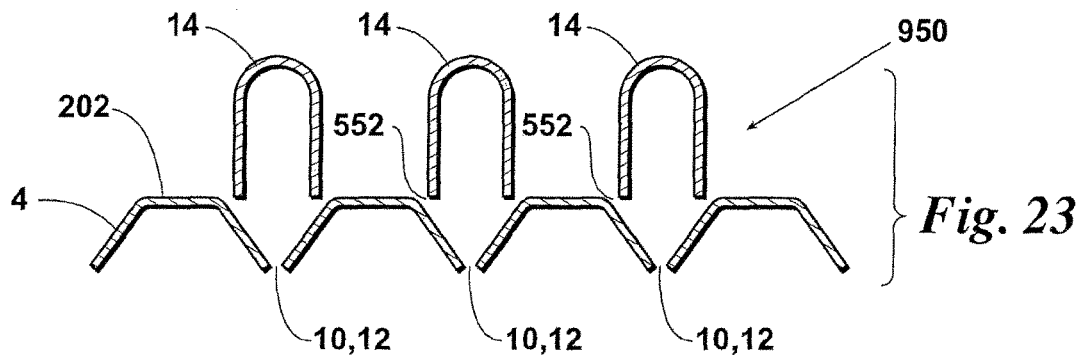
FIG. 23 schematically illustrates a cutaway elevational end view of an alternative embodiment 950 of the inventive cooking grate assembly.

An alternative embodiment 500 of the inventive grate assembly is illustrated in FIG. 13. Except for the differences discussed below, the construction, features, materials, and other particulars of the inventive grate assembly 500 will preferably be the same as those of the inventive assembly 2 and/or the inventive assembly 50 and these features will therefore provide all of the same benefits and advantages discussed above.

The inventive grate assembly 500 will preferably be identical to the inventive assembly 250 or the inventive assembly 300, or a combination thereof, except that the parallel structures 502 of the lower radiating plate 4 have flat bottom surfaces 504 with upwardly sloping sides 506.

Further alternative embodiments 550, 600, 650, and 700 of the inventive grate assembly are illustrated in FIGS. 14-18. Except for the differences discussed below, the construction, features, materials, and other particulars of the inventive grate assembles 550, 600, 650, and 700 will preferably be the same as those of the inventive assembly 2 and/or the inventive assembly 50 and these features will therefore provide all of the same benefits and advantages discussed above.

The inventive assemblies 550, 600, 650, and 700 are identical, respectively, to the inventive grate assemblies 250, 400, 450, and 500 discussed above except that the gas flow into the bottoms of the food support ribs 14 of assemblies 550, 600, 650, and 700 does not flow out of exhaust openings provided through the sides, or through the longitudinal ends, of the support ribs 14. Rather, the lower ends 25 of the food support ribs 14 are spaced above the lower radiating plate 4 (i.e., are not in contact with the lower radiating plate 4) so that gas exhaust flow is provided through the longitudinal gaps 552 thus created between the lower ends 25 of the food support ribs 14 and the upper surfaces of the lower radiating plate 4. The height of the gaps 552 will preferably be in the range of from about 0.01 to about 0.2 inch. The height of the gaps 552 will more preferably be from about 0.015 to about 0.15 inch and will most preferably be from about 0.05 to about 0.1 inch.

Thus, the inventive grate assemblies 550, 600, 650, and 700 also operate such that the flue gas is not stagnant within the support ribs 14 but continuously flows into and out of the support ribs 14 to promote heat transfer to the ribs. In addition, the abrupt change in flow direction and velocity which occurs as the hot gas escapes beneath the lower ends 25 of the food support ribs 14 creates a significant amount of turbulence which promotes further heat transfer to the base of the rib 14 and to the lower radiating plate 4. Also, the flow pattern of the hot gas through the gaps 552 beneath the side edges 25 of the food support ribs 14 also beneficially operates to block fresh air entry into the gaps between the ribs 14, thus providing additional resistance to the flare-ups. Further, the resulting low velocity flow of the hot gas out of the gaps between the support ribs 14 adds an amount of convective heat transfer to the cooking process without drying the food product.

Further alternative embodiments 800, 850, 900, 950 of the inventive grate assembly are illustrated in FIGS. 19-23. Except for the differences discussed below, the construction, features, materials, and other particulars of these inventive grate assemblies will preferably be the same as those of the inventive assembly 2 and/or the inventive assembly 50 and these features will therefore provide all of the same benefits and advantages discussed above.

The inventive grate assemblies 800, 850, 900, 950 will preferably be identical or close to identical to the inventive assemblies 550, 600, 650, 700 except that (a) the radiating plate openings 10, 12 of assemblies 800, 850, 900, 950 are located in the valleys between parallel plate structures 8, 102, 152, or 202 (as is the case with inventive assemblies 2, 50, 100, 150, and 200) and (b) the food support ribs 14 are also positioned in the valleys over the openings 10, 12 but are spaced above the lower radiating plate 4.

The inventive grate assemblies 800, 850, 900, 950 thus provide gas flow gaps 552 beneath the lower edges 25 of the food support ribs 14, similar to the inventive assemblies 550, 600, 650, 700. However, due to the location of the gas flow gaps 552 and the plate openings 10, 12 in the valleys between plate ridges 8, 102, or 202 of the type seen in assemblies 2, 50, 100, 200 (or above flat parallel plate structures 152 of the type seen in assembly 150), fat and water which drip into the gaps between the parallel support ribs 14 of the inventive assemblies 800, 850, 900, 950 will drain through the gas flow openings 10, 12 of the lower radiating plate 4. Thus, a drip pan will preferably be installed beneath the grill burner whenever these inventive grate assemblies are used. Moreover, because of the size of the gaps 552 between the support ribs 14 and the top of the lower radiating plate 4, inventive assemblies 800, 850, 900, 950 will permit debris to flow beneath the ribs 14 and into the plate openings 10, 12 and will thus require more frequent cleaning than the inventive grate assemblies 2 and 50.

Figure 24:
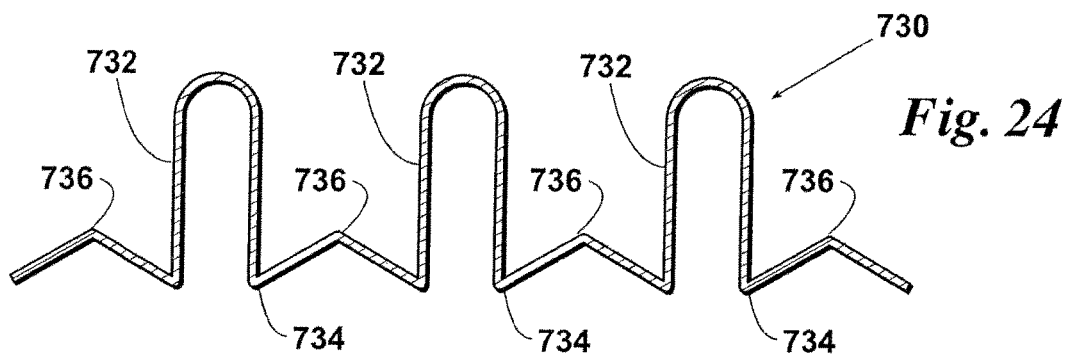
FIG. 24 schematically illustrates a cutaway elevational end view of an alternative embodiment 730 of the inventive cooking grate.
Figure 25:
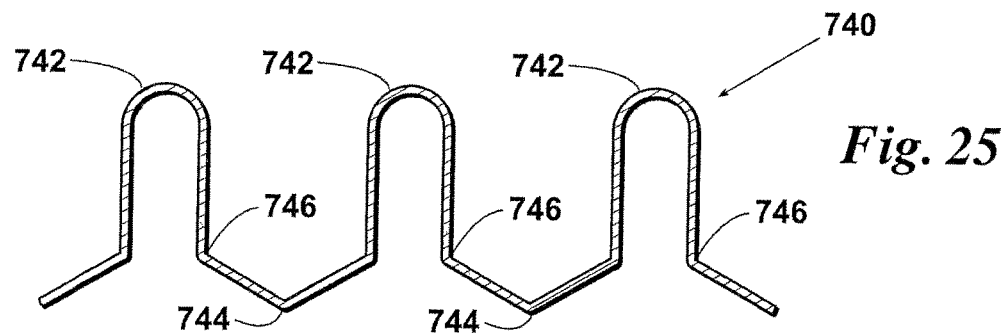
FIG. 25 schematically illustrates a cutaway elevation end view of an alternative embodiment 740 of the inventive cooking grate.

Further alternative embodiments 730 and 740 of the inventive grate are illustrated in FIGS. 24 and 25. The inventive grates 730 and 740 are respectively identical to inventive grate assembly 2 (or 50) shown in FIGS. 1-3 and inventive grate assembly 250 (or 300) shown in FIGS. 7-10, except that the inventive grates 730 and 740 are each of single piece rather than two piece construction.

For manufacturing purposes, it may be desirable to form grate 730 or 740 using a plurality of elongate food support rib pieces 732 or 742 which are placed in side-by-side contacting relationship. If so, unsealed contracting edges may exist in grate 730 at points 734 or 736 and may exist in grate 740 at points 744 or 746. Such unsealed contacting points will not allow sufficient gas flow to appreciably increase the possibility of flare-ups. However, if any unsealed gaps are present at low points 734 or 744, a drip pan will preferably be installed below the grill burner to catch the very hot, low viscosity fat which will run through these unsealed cracks.

Figure 27:
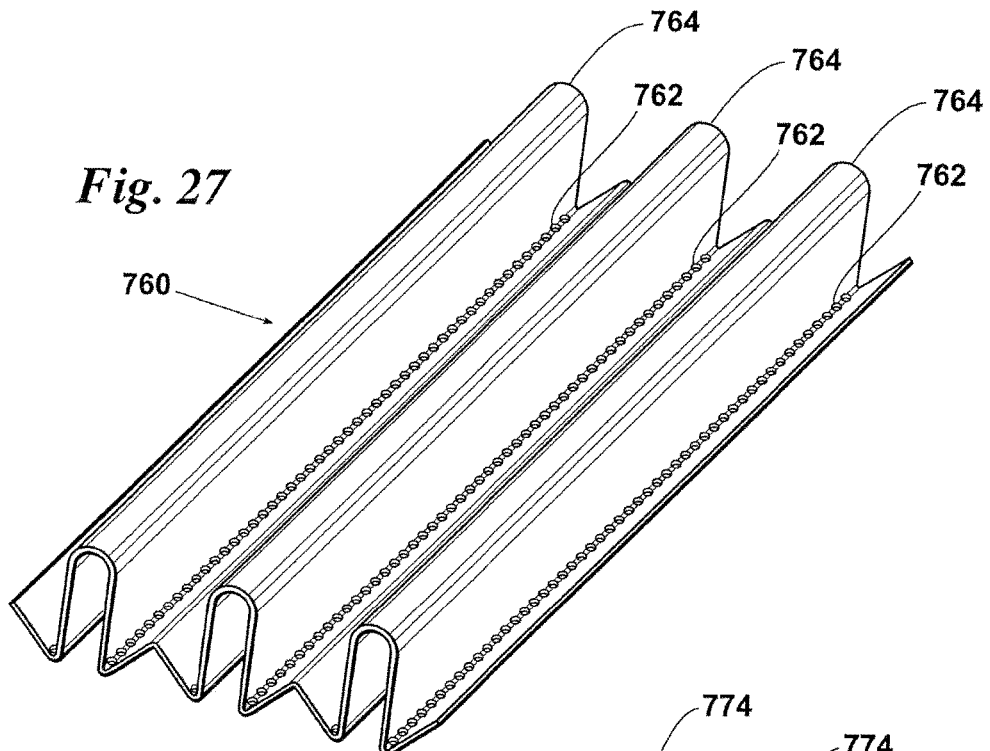
FIG. 27 is a perspective view of an alternative embodiment 760 of the inventive cooking grate.

Another alternative grate 760 is illustrated in FIG. 27. Grate 760 is substantially the same as grate 730 except that grate 760 includes one or a series of narrow apertures 762 for gas flow extending longitudinally along the base on one side or on each side of each food support rib 764 (i.e., along the lines where the bottoms of the ribs and the solid intermediate sections meet).

Figure 28:
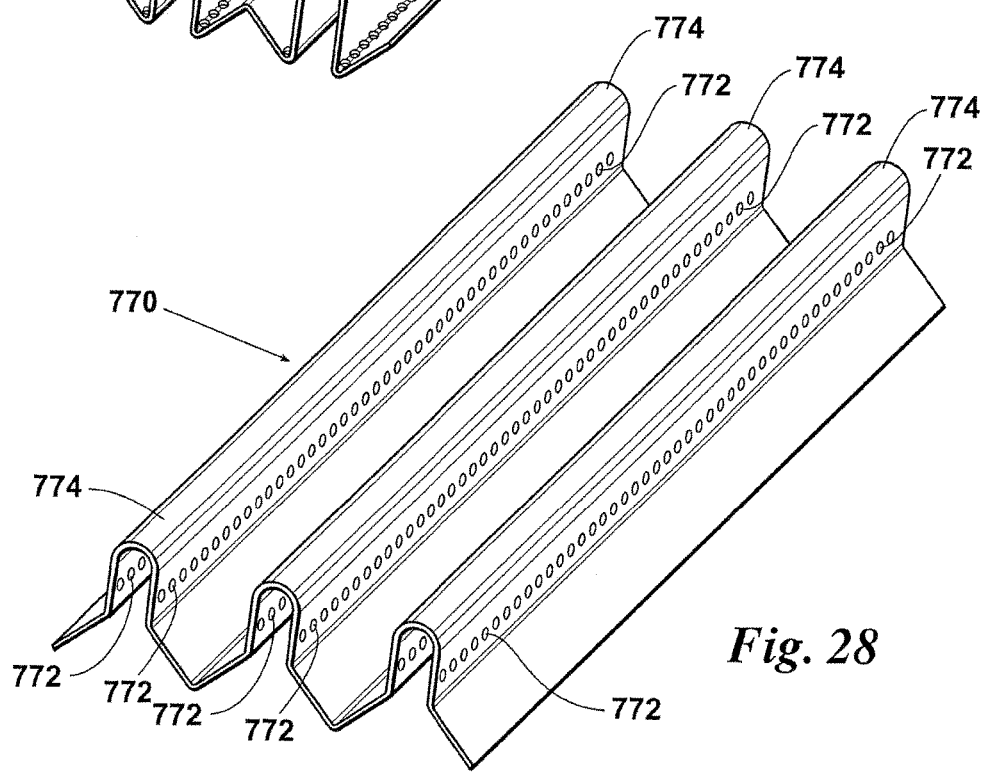
FIG. 28 is a perspective view of an alternative embodiment 770 of the inventive cooking grate.

Another alternative grate 770 is illustrated in FIG. 28. Grate 770 is substantially the same as grate 740 except that grate 770 includes one or a series of apertures 772 for gas flow extending longitudinally along one side wall or both side walls of each food support rib 774.

Figure 26:
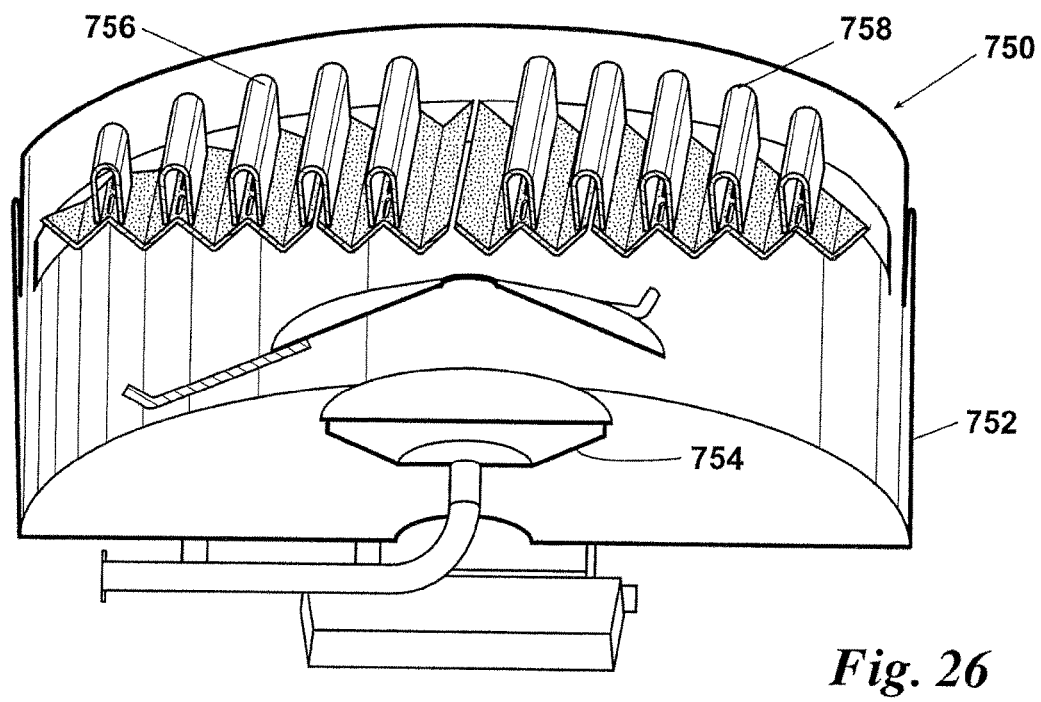
FIG. 26 is a cutaway elevational view of an embodiment 750 of the inventive grilling apparatus which utilizes the inventive cooking grate assembly 2 and/or any of the other inventive cooking grate assemblies illustrated in FIGS. 1-25.

An example of a grill assembly 750 provided by the present invention is illustrated in FIG. 26. The inventive grill assembly 750 comprises: a housing 752 which can optionally include a cover (not shown); a burner or other heating element 754 provided in the housing 752; and a pair of inventive grate assemblies 756 and 758 installed in the housing 752 above the heating element 754. The inventive grate assemblies 756 and 758 used in the grill assembly 750 can be any one or a combination of any of the various inventive grate assemblies which are discussed above and are illustrated in any of FIGS. 1-25. The heating element 752 can be any type of burner or electric heating element or charcoal bed known in the art, including even an expensive multi-tube burner or infrared burner. However, the inventive grate assemblies and grill assembly 750 provided by the present invention are also capable of providing excellent results with the heating element 754 being, for example, a gas tube burner, a pancake burner, or other common, inexpensive gas burner known in the art.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. An outdoor grill assembly comprising a grill housing, at least one grill heating element installed in said grill housing, and at least one cooking grate assembly positioned in said grill housing above said grill heating element, wherein said cooking grate assembly comprises:
   a lower structure comprising a side-by-side series of parallel, longitudinally extending solid sections having no openings therethrough;
   a series of parallel, longitudinally extending open sections provided in said lower structure, said longitudinally extending open sections being located between said longitudinally extending solid sections, each of said longitudinally extending open sections having an open area lateral width; and
   an upper structure comprising a side-by-side series of parallel, spaced apart, longitudinally extending food support ribs, each having a hollow interior and a longitudinally extending bottom opening, said longitudinally extending bottom opening having a lateral width that is not less than said open area lateral width of said longitudinally extending open sections of said lower structure,
   said upper structure having longitudinally extending gaps between said longitudinally extending food support ribs and said upper structure being removably positionable over said lower structure such that as viewed from above said cooking grate assembly (a) said longitudinally extending food support ribs are positioned over and parallel to said longitudinally extending open sections of said lower structure so that said longitudinally extending food support ribs straddle and cover said longitudinally extending open sections of said lower structure and (b) said longitudinally extending solid sections of said lower structure are positioned in said longitudinally extending gaps between said longitudinally extending food support ribs; and
   said cooking grate assembly further comprising a flow path defined by said lower structure and said upper structure which directs a flow of a combustion gas or heated air produced by said grill heating element wherein, when said upper structure is positioned over said lower structure, said longitudinally extending open sections of said lower structure are located within, at, or below said longitudinally extending bottom openings of said longitudinally extending food support ribs so that said flow path for said combustion gas or heated air produced by said grill heating element travels upwardly through both said longitudinally extending open sections of said lower structure and said bottom opening of said longitudinally extending food support ribs and upwardly into said hollow interiors of said longitudinally extending food support ribs.

2. The outdoor grill assembly of claim 1 wherein said longitudinally extending solid sections of said lower structure have a downwardly extending cross-sectional V-shape.

3. The outdoor grill assembly of claim 1 wherein said longitudinally extending food support ribs have an inverted U cross-sectional shape.

4. The outdoor grill assembly of claim 1 wherein said longitudinally extending solid sections of said lower structure have an upwardly extending inverted V cross-sectional shape such that said longitudinally extending solid sections form longitudinally extending ridges between said longitudinally extending food support ribs.

5. The outdoor grill assembly of claim 1 wherein said longitudinally extending food support ribs each have at least one open longitudinal end which is open for flow of said combustion gas or heated air produced by said grill heating element out of said hollow interiors of said longitudinally extending food support ribs so that said flow path defined by said lower structure and said upper structure for said combustion gas or heated air produced by said grill heating element further travels through said hollow interiors of said longitudinally extending food support ribs and out of said open longitudinal ends of said longitudinally extending food support ribs.

6. The outdoor grill assembly of claim 1 wherein:
   said longitudinally extending food support ribs each have two opposing rib side walls;
   said two opposing rib side walls have longitudinally extending bottom edges;
   when said upper structure is positioned over said lower structure, said longitudinally extending bottom edges of said rib side walls contact an upper surface of said lower structure to obstruct said combustion gas or heated air produced by said grill heating element at least from flowing into lower portions of said longitudinally extending gaps between said longitudinally extending food support ribs; and
   said combustion gas or heated air produced by said grill heating element is also obstructed by said longitudinally extending solid sections of said lower structure from flowing into said lower portions of said longitudinally extending gaps between said longitudinally extending food support ribs.

7. The outdoor grill assembly of claim 6 wherein:
   said longitudinally extending solid sections of said lower structure have an upwardly extending cross-sectional shape and
   said longitudinally extending bottom edges of said rib side walls contact said upper surface of said lower structure in a non-sealed manner which, during cooking, allows hot fat which falls into said longitudinally extending gaps between said longitudinally extending food support ribs to drain beneath said non-sealed longitudinally extending bottom edges of said rib side walls and through said longitudinally extending open sections of said lower structure.

8. The outdoor grill assembly of claim 1 wherein said open area lateral width of said open sections of said lower structure is less than said lateral width of said longitudinally extending bottom openings of said food support ribs.

9. The outdoor grill assembly of claim 1 wherein, when said upper structure is positioned over said lower structure, said longitudinally extending open sections of said lower structure are received in said longitudinally extending bottom openings of said longitudinally extending food support ribs.

10. The outdoor grill assembly of claim 1 wherein said longitudinally extending open sections of said lower structure are each formed by a longitudinally extending slot or by a plurality of slots or other apertures.

11. An outdoor grill assembly comprising a grill housing, at least one grill heating element installed in said grill housing, and at least one cooking grate assembly positioned in said grill housing above said grill heating element, wherein said cooking grate assembly comprises:
    a lower structure comprising a side-by-side series of parallel, longitudinally extending solid sections having no openings therethrough;
    a series of parallel, longitudinally extending open sections provided in said lower structure, said longitudinally extending open sections being located between said longitudinally extending solid sections, each of said longitudinally extending open sections having an open area lateral width; and
    an upper structure comprising a side-by-side series of parallel, spaced apart, longitudinally extending food support ribs, each having a hollow interior and a longitudinally extending bottom opening, said longitudinally extending bottom opening having a lateral width that is not less than said open area lateral width of said longitudinally extending open sections of said lower structure,
    said upper structure having longitudinally extending gaps between said longitudinally extending food support ribs and said upper structure being removably positionable on said lower structure such that as viewed from above said cooking grate assembly (a) said longitudinally extending food support ribs are positioned over and parallel to said longitudinally extending open sections of said lower structure so that said longitudinally extending food support ribs straddle and cover said longitudinally extending open sections of said lower structure and (b) said longitudinally extending solid sections of said lower structure are positioned in said longitudinally extending gaps between said longitudinally extending food support ribs; and
    said cooking grate assembly further comprising a flow path defined by said lower structure and said upper structure which directs a flow of a combustion gas or heated air produced by said grill heating element wherein, when said upper structure is positioned on said lower structure, said longitudinally extending open sections of said lower structure are located within, at, or below said longitudinally extending bottom openings of said longitudinally extending food support ribs so that said flow path for said combustion gas or heated air produced by said grill heating element travels upwardly through both said longitudinally extending open sections of said lower structure and said longitudinally extending bottom openings of said longitudinally extending food support ribs and travels upwardly into said hollow interiors of said longitudinally extending food support ribs;
    said longitudinally extending food support ribs each have two opposing rib side walls;
    said two opposing rib side walls have longitudinally extending bottom edges;
    when said upper structure is positioned on said lower structure, said longitudinally extending bottom edges of said rib side walls contact an upper surface of said lower structure to obstruct said combustion gas or heated air produced by said grill heating element from flowing into said longitudinally extending gaps between said longitudinally extending food support ribs;
    said combustion gas or heated air produced by said grill heating element is also obstructed by said longitudinally extending solid sections of said lower structure from flowing into said longitudinally extending gaps between said longitudinally extending food support ribs; and
    wherein said longitudinally extending food support ribs each have at least one open longitudinal end which is open for flow of said combustion gas or heated air produced by said grill heating element out of said hollow interiors of said longitudinally extending food support ribs so that said flow path defined by said lower structure and said upper structure for said combustion gas or heated air produced by said grill heating element further travels through said hollow interiors of said longitudinally extending food support ribs and out of said open longitudinal ends of said longitudinally extending food support ribs.

12. The outdoor grill assembly of claim 11 wherein said longitudinally extending solid sections of said lower structure have a downwardly extending cross-sectional V-shape.

13. The outdoor grill assembly of claim 11 wherein said longitudinally extending food support ribs have an inverted U cross-sectional shape.

14. The outdoor grill assembly of claim 11 wherein said longitudinally extending solid sections of said lower structure have an upwardly extending inverted V cross-sectional shape such that said longitudinally extending solid sections form longitudinally extending ridges between said longitudinally extending food support ribs.

15. The outdoor grill assembly of claim 11 wherein:
    said longitudinally extending solid sections of said lower structure have an upwardly extending cross-sectional shape and
    said longitudinally extending bottom edges of said rib side walls contact said upper surface of said lower structure in a non-sealed manner which, during cooking, allows hot fat which falls into said longitudinally extending gaps between said longitudinally extending food support ribs to drain beneath said non-sealed longitudinally extending bottom edges of said rib side walls and through said longitudinally extending open sections of said lower structure.

16. The outdoor grill assembly of claim 11 wherein said open area lateral width of said open sections of said lower structure is less than said lateral width of said longitudinally extending bottom openings of said food support ribs.

17. The outdoor grill assembly of claim 11 wherein, when said upper structure is positioned on said lower structure, said longitudinally extending open sections of said lower structure are received in said longitudinally extending bottom openings of said longitudinally extending food support ribs.

18. The outdoor grill assembly of claim 1 wherein said longitudinally extending open sections of said lower structure are each formed by a longitudinally extending slot or by a plurality of slots or other apertures.

* * * * *

UNITED STATES PATENT AND TRADEMARK OFFICE
CERTIFICATE OF CORRECTION

PATENT NO. : 10,034,577 B2
APPLICATION NO. : 14/869210
DATED : July 31, 2018
INVENTOR(S) : Mallik Ahmed Page 1 of 1

It is certified that error appears in the above-identified patent and that said Letters Patent is hereby corrected as shown below:

In the Claims

Claim 18, Column 16, Line 66: Replace "claim 1" with "claim 11"

Signed and Sealed this
Thirtieth Day of October, 2018

Andrei Iancu
*Director of the United States Patent and Trademark Office*